3,278,406
PREPARATION OF FLUOROCARBONS
William A. Mod, Lake Jackson, Gerald Peltier, Danbury, and William R. Von Tress, Lake Jackson, Tex., assignors to The Dow Chemical Company, Midland, Mich., a corporation of Delaware
No Drawing. Filed Sept. 7, 1962, Ser. No. 222,208
6 Claims. (Cl. 204—163)

This invention relates to a method for preparing fluorocarbons and more particularly is concerned with a process for preparing perfluorinated hydrocarbons by reacting chlorine with methylene fluoride ($CF_2H_2$) at low temperatures in the presence of visible or ultra-violet light.

Presently, perfluorinated hydrocarbons such as tetrafluoroethylene ($C_2F_4$), for example, are prepared by pyrolyzing chlorodifluoromethane ($CF_2ClH$) at temperatures of from about 600° C. to about 700° C. In this process the rate of conversion of the chlorofluoromethane per pass must be kept low, for example about 27% per pass, to prevent undesirable carbon formation and other undesirable side reactions. In this present commercial process, therefore, for economical operation a considerable amount of unreacted chlorofluoromethane reactant must be separated from the product gases and recycled.

Other methods propose that tetrafluoroethylene can be prepared by high temperature pyrolysis of trifluoromethane at temperatures of from about 1500 to about 2500° C. by means of electric arc devices and hot graphite tube reactors.

Now unexpectedly it has been found in the process of the instant invention that formation of tetrafluoroethylene and other perfluorinated and fluoro-substituted hydrocarbons readily can be accomplished by reacting together chlorine and methylene fluoride in the presence of visible or ultra-violet light radiation to give a high conversion of methylene fluoride at relatively low temperatures of from about 40° C. to about 450° C.

It is a principal object of the present invention to provide a low temperature process for preparing perfluorinated hydrocarbons wherein the conversion of the methylene fluoride reactant is as high as about 98% of theoretical.

It is another object of the present invention to provide a low temperature method for preparing perfluorinated hydrocarbons, such as tetrafluoroethylene, which method eliminates or minimizes the need for use of costly materials of construction in the reactors.

It is another object of the present invention to provide a method for preparing tetrafluoroethylene wherein the amount of unreacted methylene fluoride starting material is minimal in comparison with that obtained in present commercial processes thereby making the separation of such reactant material from the product mass a relatively easy process.

It is still a further object of the present invention to provide a process for preparing readily separated fluorocarbon products having considerable commercial importance.

These and other objects and advantages will be apparent from the detailed description presented hereinafter.

In the instant process, chlorine and methylene fluoride, i.e. difluoromethane, are reacted at a temperature of from about 40° to about 450° C. in the presence of ultra-violet or visible light at a chlorine to methylene fluoride volume ratio of from about 0.75 to about 1.5 and a residence time of the reaction mixture at the reaction temperature of from about 0.01 to about 10 seconds. Preferably the reaction temperature is from about 100 to about 400° C. and the residence time of the reaction mixture at the reaction temperature is from about 0.5 to about 1 second. In operation with ultra-violet light irradiation, a chlorine to difluoromethane volume ratio of from about 0.75 to about 1.0 preferably is employed. With visible light irradiation, a volume ratio of about 1.0 is preferred. The term "visible light" as used herein refers to light radiation having a wave length of from about 4000 to about 7000 A. Ultra-violet light radiation suitable for use in the present process is that having a wave length from about 4000 down to about 2000 A.

Visible light sources suitable for use as a reaction promoter or catalyst in the instant process include sunlight GE 100 w. T8½ bulb and the like. Ultra-violet light sources which have been found to be effective include, for example, GE H100A4 Hg lamp, GE 300 w. VA3 bulb, GEF 15TS BLB bulb, and the like.

The instant process can be carried out on a batch, continuous or cyclic type process. Preferably, however, the process will be carried out on a continuous basis wherein the gaseous reactants are injected simultaneously into a heated reaction zone and the product materials recovered at the exit of the heated area. For such operation a tube furnace preferably is employed. The instant process, however, can be carried out utilizing any of a wide variety of conventional heated reactor vessels, furnaces and the like as known to one skilled in the art.

The materials of construction to be employed in the reactor for the instant process are not critical except that these have the necessary structural and physical characteristics to stand up under the reaction conditions. Also, these should not be reacted upon in an undesirable manner by the reaction materials or the products of the reaction. Conveniently high strength glass or glass lined vessels are employed.

With glass reactors, if a glass transparent to ultra-violet and visible radiation is used, e.g. a Vycor quartz glass, the irradiation source can be positioned outside the reactor.

Although the instant process is employed primarily to obtain tetrafluoroethylene, other useful compounds simultaneously are co-produced from the reaction of chlorine and methylene fluoride by the practice of the present method. These products include, for example, hexafluoropropene, dichlorotetrafluoroethylene, dichlorodifluoroethylene and monochlorodifluoromethane.

The perfluoro- and partially fluorinated materials produced by the instant process find utility, for example, as refrigerants, aerosol propellants, intermediates for polymers, electrical insulation, etc.

The following examples will serve to illustrate further the present invention but are not meant to limit it thereto.

EXAMPLE 1

A Vycor quartz glass air-cooled tube about 12 inches long having an internal diameter of about 8 mm. was placed near a ultra-violet irradiation source. This source exposed about a 2 inch length of the tube. A thermocouple was taped to the outside of the tube wall. The ultra-violet irradiation source was activated and a mixture of methylenefluoride and chlorine was fed to the reactor. The gases were passed through a premixing tube to blend these before they entered the reactor. The product gases exiting from the reactor tube were passed through a water-cooled condenser.

A number of runs were made wherein the reaction temperature was controlled at a predetermined temperature. For each of these runs, prdouct gas samples (200–500 ml.) were collected after the reactor temperature had become stabilized at that selected for a given run.

The gas samples were analyzed by vapor phase chromatography and infrared spectroscopy. Table I, which follows, tabulates the data and results obtained from this series of tests. Reactant conversion and product yield were calculated from the analytical data.

EXAMPLE 2

The same procedure and apparatus was employed as described for Example 1 except that a visible light source (a GE 100 w. T8½ electric bulb) was employed as activator instead of the ultra-violet irradiation device. Table II summarizes the data and results from this test.

EXAMPLE 3

The same procedure was followed as described for Example 1 except that an 8 millimeter (I.D.) Vycor glass tube about 36 inches long and wound into a 2 inch diameter coil was used as the reactor. A number of runs were made to evaluate the effect of $Cl_2/CF_2H_2$ volume ratio on the product yield. Table III summarizes the results of this test.

EXAMPLE 4

The coil tube reactor described in Example 3 was used along with a visible light irradiation source in a number of runs evaluating the effect of $Cl_2/CF_2H_2$ volume ratio on product yield. Table IV presents the results of this series of tests.

Various modifications can be made in the process of the present invention without departing from the spirit or scope thereof for it is understood that we limit ourselves only as defined in the appended claims.

We claim:
1. A process for preparing fluorocarbons which comprises:
   reacting chlorine and methylene fluoride for a period of from about 0.01 to about 10 seconds at a temperature of from about 40° to about 450° C. in the presence of light radiation of wave length from about 7000 A. to about 2000 A., and at a chlorine/methylene fluoride volume ratio of from about 0.75 to about 1.5.
2. A process for preparing fluorocarbons which comprises:
   (a) providing a reaction mixture of chlorine and methylene fluoride, said mixture having a chlorine/methylene fluoride volume ratio of from about 0.75 to about 1.0,
   (b) introducing said mixture into a reactor maintained at a temperature of from about 100 to about 400° C.,
   (c) reacting said reaction mixture in said heated reactor for a period of from about 0.5 to about 1.0 second in the presence of a reaction promoter selected from the group consisting of visible light radiation and ultraviolet light radiation having a wave length of from about 7000 A. to about 2000 A., and

*Table I*

| Run No. | Reactants | | | Contact Time, sec. | Reactor Temp., °C. | $CF_2H_2$ Conv., percent | Product Yield | | | | |
|---|---|---|---|---|---|---|---|---|---|---|---|
| | $CF_2H_2$, cc./min. | $Cl_2$, cc./min. | $Cl_2/CF_2H_2$, vol. ratio | | | | $C_2F_4$ | $C_3F_6$ | $CF_2Cl_2$ | $C_2F_4Cl_2$ | $CF_2HCl$ |
| 1 | 800 | 795 | 0.99 | 0.06 | 170 | 85.4 | 28.2 | 0.8 | 18.2 | 1.5 | 48.0 |
| 2 | 1,310 | 1,275 | 0.98 | 0.03 | 232 | 84.9 | 30.1 | 0.9 | 17.7 | 1.4 | 46.4 |
| 3 | 410 | 405 | 0.99 | 0.15 | 102 | 83.6 | 29.3 | 0.6 | 16.4 | 2.2 | 48.9 |
| 4 | 230 | 230 | 1.0 | 0.29 | 70 | 88.1 | 26.0 | 0.9 | 19.6 | 1.9 | 49.4 |
| 5 | 135 | 110 | 0.82 | 0.57 | 45 | 54.5 | 10.6 | Tr. | 13.2 | 1.3 | 72.8 |

*Table II*

| Run No. | Reactants | | | Contact Time, sec. | Reactor Temp., °C. | $CF_2H_2$ Conv., percent | Product Yield | | | | |
|---|---|---|---|---|---|---|---|---|---|---|---|
| | $CF_2H_2$, cc./min. | $Cl_2$, cc./min. | $Cl_2/CF_2H_2$, vol. ratio | | | | $C_2F_4$ | $C_3F_6$ | $CF_2Cl_2$ | $C_2F_4Cl_2$ | $CF_2HCl$ |
| 1 | 1,310 | 1,275 | 0.98 | 0.05 | 70 | 88.7 | Tr. | 0 | 8.1 | 0 | 91.9 |
| 2 | 800 | 795 | 0.99 | 0.08 | 75 | 87.7 | 0 | 0 | 7.5 | 0 | 92.5 |
| 3 | 410 | 405 | 0.99 | 0.14 | 125 | 78.9 | Tr. | 0 | 20.5 | 11.1 | 67.8 |
| 4 | 230 | 230 | 1.0 | 0.25 | 120 | 84.3 | 21.3 | 0.6 | 18.5 | 2.2 | 53.3 |
| 5 | 135 | 110 | 0.82 | 0.54 | 60 | 74.5 | 30.9 | 1.1 | 19.2 | 3.0 | 43.4 |

*Table III*

| Run No. | Reactants | | | Contact Time, sec. | Reactor Temp., °C. | $CF_2H_2$ Conv., percent | Product Yield | | | | |
|---|---|---|---|---|---|---|---|---|---|---|---|
| | $CF_2H_2$, cc./min. | $Cl_2$, cc./min. | $Cl_2/CF_2H_2$, vol. ratio | | | | $C_2F_4$ | $C_3F_6$ | $CF_2Cl_2$ | $C_2F_4Cl_2$ | $CF_2HCl$ |
| 1 | 1,310 | 660 | 0.51 | 0.8 | 225 | 55.0 | 0 | 0 | 5.0 | 0.4 | 94.2 |
| 2 | 1,310 | 1,000 | 0.76 | 0.7 | 260 | 79.1 | 30.3 | 0.4 | 13.3 | Nil | 54.7 |
| 3 | 1,310 | 1,300 | 0.99 | 0.6 | 270 | 87.0 | 35.4 | 2.0 | 20.8 | 10.6 | 25.2 |
| 4 | 1,310 | 1,645 | 1.26 | 0.5 | 310 | 98.7 | 29.7 | 11.3 | 30.5 | 5.6 | 12.3 |
| 5 | 1,310 | 1,990 | 1.52 | 0.4 | 340 | 99.0 | 25.3 | 2.5 | 41.6 | 3.2 | 2.4 |

*Table IV*

| Run No. | Reactants | | | Contact Time, sec. | Reactor Temp., °C. | $CF_2H_2$ Conv., percent | Product Yield | | | | |
|---|---|---|---|---|---|---|---|---|---|---|---|
| | $CF_2H_2$, cc./min. | $Cl_2$, cc./min. | $Cl_2/CF_2H_2$, vol. ratio | | | | $C_2F_4$ | $C_3F_6$ | $CF_2Cl_2$ | $C_2F_4Cl_2$ | $CF_2HCl$ |
| 1 | 1,310 | 660 | 0.51 | 0.9 | 200 | 46.5 | 0 | 0 | 4.1 | 0 | 95.9 |
| 2 | 1,310 | 1,000 | 0.76 | 0.7 | 265 | 72.0 | 0 | 0 | 7.0 | 0 | 93.1 |
| 3 | 1,310 | 1,300 | 0.99 | 0.5 | 325 | 89.3 | 45.5 | 2.1 | 24.6 | 2.1 | 22.1 |
| 4 | 1,310 | 1,645 | 1.26 | 0.4 | 375 | 98.0 | 19.4 | 8.0 | 43.8 | 4.4 | 5.8 |
| 5 | 1,310 | 1,990 | 1.52 | 0.3 | 430 | 98.3 | 35.6 | 2.3 | 37.0 | 2.6 | 2.5 |
| 6 | 1,645 | 1,645 | 1.0 | 0.4 | 410 | 89.6 | 46.9 | 3.0 | 19.9 | 1.5 | 19.6 |

(d) removing the fluorocarbon containing products from the reaction zone.

3. A process for preparing tetrafluoroethylene which comprises:
   (a) introducing a reaction mixture of chlorine and methylene fluoride into a reactor maintained at a temperature of from about 70 to about 340° C., in the presence of ultraviolet radiation having a minimum wave length of about 2000 A., said reaction mixture having a chlorine/methylene fluoride volume ratio of from about 0.75 to about 1.5,
   (b) maintaining said reaction mixture in said reactor for a residence time of from about 0.03 to about 0.8 second, and
   (c) removing the tetrafluoroethylene containing product mass from said reactor.

4. The process as defined in claim 3 wherein the reaction is carried out continuously in a tube-type reactor which is transparent to ultraviolet radiation.

5. A process for preparing tetrafluoroethylene which comprises:
   (a) introducing a reaction mixture of chlorine and methylene fluoride into a reactor maintained at from about 60 to about 430° C. in the presence of visible light radiation, said reaction mixture having a chlorine/methylene fluoride volume ratio of from about 0.8 to about 1.5,
   (b) maintaining said reaction mixture in said reactor for a residence time of from about 0.25 to about 0.5 second, and
   (c) removing the tetrafluoroethylene containing product mass from said reactor.

6. The process as defined in claim 5 wherein the reaction is carried out continuously in a tube-type reactor which is transparent to visible light radiation.

References Cited by the Examiner

UNITED STATES PATENTS 3,078,220  2/1963  Cassatt et al. _____ 204—163

JOHN H. MACK, *Primary Examiner.*

H. S. WILLIAMS, *Assistant Examiner.*